United States Patent [19]

Brand et al.

[11] Patent Number: 4,598,310

[45] Date of Patent: Jul. 1, 1986

[54] CIRCUIT ARRANGEMENT FOR OBTAINING A PHASE-SENSITIVE CONTROL QUANTITY, IN PARTICULAR IN A COLOR TELEVISION RECEIVER

[75] Inventors: Gerd Brand, Didderse; Wilhelm Möring, Brunswick, both of Fed. Rep. of Germany

[73] Assignee: U.S. Philips Corporation, New York, N.Y.

[21] Appl. No.: 546,685

[22] Filed: Oct. 28, 1983

[30] Foreign Application Priority Data

Oct. 28, 1982 [DE] Fed. Rep. of Germany ....... 3239933

[51] Int. Cl.⁴ .............................................. H04N 9/45
[52] U.S. Cl. ......................................... 358/19; 358/13;
375/119; 324/83 D; 324/83 Q; 328/134;
328/155
[58] Field of Search ................. 358/13, 19; 324/83 D,
324/83 Q; 375/119, 39; 328/134, 155

[56] References Cited

U.S. PATENT DOCUMENTS 4,307,346 12/1981 Kurosawa et al. ................... 328/155
4,404,583 9/1983 Tatami .................................. 358/13
4,412,181 10/1983 Marguinaud et al. ................ 358/23

FOREIGN PATENT DOCUMENTS 2225753 11/1974 France ............................... 324/83 D Primary Examiner—John W. Shepperd
Attorney, Agent, or Firm—Thomas A. Briody; William J. Streeter; Edward W. Goodman

[57] ABSTRACT

A circuit arrangement for obtaining a control quantity which is dependent on the phase shift of a color burst signal comprising an amplitude factor with respect to a reference signal, preferably of approximately the same frequency, which is phase-locked to a clock signal with which the amplitude values of the color burst signal are sampled and whose frequency is the 4n-fold of the frequency of the reference signal. n is an integer and the keying occurs in such manner that a first sampled difference signal obtained by the sampling and a second sampled difference signal shifted by a quarter of a cycle of the color burst signal, are obtained which are proportional to the amplitude of the color burst signal. For evaluating as directly as possible the phase error independently of the amplitude factor, at least one sampled difference signal (X and Y, respectively) is divided by the amplitude factor (A) in a conversion stage (55) in such manner that at least one phase-sensitive control quantity is obtained which consists substantially of sin- and/or cos-members of the phase angle ($\alpha$), optionally of a sum or a difference or a product thereof which is at least substantially independent of the amplitude factor.

20 Claims, 11 Drawing Figures

CIRCUIT ARRANGEMENT FOR OBTAINING A PHASE-SENSITIVE CONTROL QUANTITY, IN PARTICULAR IN A COLOR TELEVISION RECEIVER

BACKGROUND OF THE INVENTION

The invention relates to a circuit arrangement for obtaining a phase-sensitive control quantity which depends on the phase shift of a color burst signal having an amplitude factor, with respect to a reference signal, preferably of approximately the same frequency, which is phase-locked to a clock signal with which the amplitude values of the color burst signal are sampled and whose frequency is the 4n-fold of the frequency of the reference signal, wherein n is an integer of the series 1, 2, ... and the keying occurs in such manner that a first sampled difference signal (X, for example $A \cdot (\sin \alpha + \cos \alpha)$) and a second sampled difference signal (Y, for example $A \cdot (\cos \alpha - \sin \alpha)$) shifted by a quarter of a cycle of the color burst signal are obtained, wherein said sampled difference signals are proportional to the amplitude (A) of the color burst signal and which depend on the phase angle ($\alpha$) of the color burst signal with respect to a point of time determined by the reference signal according to an angular function, said sampled difference signal (Y) being the difference between a third and a first of said samples while said sampled difference signal (X) being the difference between a fourth and a second of said samples, in which the sampled difference signals (X and Y) are squared and the root is extracted from their sum in such manner that the amplitude factor is obtained and in which furthermore, by means of at least one conversion stage to the input of which the first and the second signal samples are applied, at least one phase-sensitive control quantity, which depends on the phase angle ($\alpha$) and is at least substantially independent of the amplitude factor, is obtained.

Such a circuit arrangement is known from the European Patent Application No. 00 37 317 which corresponds to U.S. Pat. No. 4,412,181. In this arrangement, signal samples which correspond to $A \cdot \sin \alpha$ and $A \cdot \cos \alpha$, are obtained from the chrominance signal and the color burst signal by sampling. From these the angle $\alpha$ should be obtained in an amplitude-independent manner, in that the tangent is formed by the quotient of both values and then the angle (inverse tangent) is derived. During the color burst signal, an angle of deviation, if any, if so determined and by addition and subtraction, respectively, to the angle of the color vector is eliminated there. Finally, the value of the color vector obtained separately from said angle determination is multiplied by the sin and cos, respectively, of the corrected color angle and the pure components of the chrominance signal are so obtained.

The angle obtained via the tangent, however, is uncertain by 180° since the tangents in the first and second and in the third and fourth quadrants, respectively, are equal according to amount and slope. Moreover, the tangent goes to infinity so that a very large scope of values is to be computed and processed.

SUMMARY OF THE INVENTION

It is the object of the invention in a circuit arrangement of the type mentioned in the opening paragraph, to reduce the costs and to determine and evaluate the phase error independently of the amplitude factor as much as possible in a direct manner.

According to the invention this object is achieved in that in the conversion stage comprising, in particular, logic circuit elements, at least one sampled difference signal (X and Y, respectively) is divided by the amplitude factor (A) in such manner that at least one phase-sensitive control quantity is obtained which consists substantially of sin- and/or cos-members of the phase angle ($\alpha$), optionally of a sum, or a difference, or a product thereof, which is at least substantially independent of the amplitude factor.

The resulting phase-sensitive control quantity may be applied to the oscillator determining the clock signal for frequency and/or phase control, in which the control can be effected, for example, at the nominal values $\alpha = 0°$ and $\alpha = 45°$, respectively.

In particular, the conversion may be carried out so that it corresponds, at least substantially, to the formula $X/\sqrt{(X^2+Y^2)}$ and $Y/\sqrt{(X^2+Y^2)}$, respectively, so that a control quantity is obtained which is proportional to ($\pm\sin \alpha + \cos \alpha$). As a result of this, in particular, a control at $\alpha = 45°$ can be achieved when the control quantity is applied to the oscillator as an adjusting variable.

According to another embodiment, the conversion is carried out so that it corresponds, at least substantially, to the formula $(X \pm Y)/\sqrt{(X^2+Y^2)}$ so that a control quantity is obtained which is proportional to $\cos \alpha$ and $\sin \alpha$, respectively. As a result of this, in particular, a control at $\alpha = 0°$ or $\alpha = 90°$ is possible. Furthermore, with these quantities which are obtained in the color burst interval, the chrominance signal of the following line can be corrected point-by-point by compaction.

According to a further embodiment, the conversion may be carried out so that it corresponds, at least substantially, to the formulae:

$$\frac{(X - Y) \cos \alpha_o - (X + Y) \sin \alpha_o}{\sqrt{(X^2 + Y^2)}}$$

and $$\frac{(X - Y) \sin \alpha_o + (X - Y) \cos \alpha_o}{\sqrt{X^2 + Y^2}}$$

respectively, so that an adjusting variable is obtained which is proportional to $\sin (\alpha - \alpha_o)$ and $\cos (\alpha - \alpha_o)$, respectively. As a result of this, a certain shift of the color vector by the angle $\alpha_o$ may be carried out so that the chromaticity may be varied. In PAL signals, the correction value must be switched line-by-line in sign, which, however, does not present any difficulties since a PAL switching signal is available all the same.

For smoothing, the phase control quantity may be conducted through a proportionally and/or integratingly filter member. In this manner a proportional and, optionally, an integral controller can be realized.

According to an embodiment of the invention, for correcting the phase of a chrominance signal having a frequency which is the same as compared with the color burst signal, a phase control quantity and the chrominance signal are applied to a multiplier stage, the output signal of which provides the chrominance signal which is corrected in phase and optionally is demodulated so as to be phase correct. Advantageously, said output signal can be combined additively or subtractively with the output signal of a further multiplier stage controlled by means of another phase control signal, optionally via a delaying stage.

According to another embodiment of the invention, a first phase control quantity corresponding to (sin $\alpha$ + cos $\alpha$), and a second phase control quantity corresponding to (cos $\alpha$ − sin $\alpha$), are formed from the first and the second sampled difference signals and preferably applied, via a filter retaining higher frequency signals, to a first and a second mixer stage, respectively, to the other input of which the chrominance signal is applied directly or delayed by a clock period, and the output signals of which are combined in an adder stage in such manner that the chrominance signal occurs substantially without phase error at the output of the adder stage.

According to a further embodiment of the invention, a first phase control quantity corresponding too sin $\alpha$ and a second phase control quantity corresponding to a cos $\alpha$ are formed from the first and the second sampled difference signals and, preferably, via a filter retaining higher frequency signals, are applied, via an allocation stage, alternately and optionally with varying signs, to a third and a fourth mixer stage, to the other inputs of which the chrominance signal is applied, the allocation being such that the signals comprised on the chrominance signal in orthogonal modulation, appear demodulatedly at the outputs of the multiplier stages.

As a result of this, the individual sample values are allocated to one and to the other modulation signal, respectively, and demodulated. If necessary, the sign reversal occurring in a PAL signal in the red color difference signal, must subsequently be corrected, if desired, but the correction may also be carried out simultaneously in the demodulation.

In this embodiment, the output signals of the multiplier stage are preferably applied via a filter suppressing higher frequency signals. Said filtering may preferably be achieved in that the output signal of a multiplier stage is applied to an adder stage, on the one hand directly and on the other hand via a stage delaying by an interval corresponding to a quarter cycle of the second alternating current signal, so that the filtered demodulated signal occurs at the output of the adder stage.

DESCRIPTION OF THE DRAWINGS

The invention will now be described in greater detail, by way of example, with reference to the accompanying drawings, in which.

DESCRIPTION OF THE PREFERRED EMBODIMENTS

Figure 1:
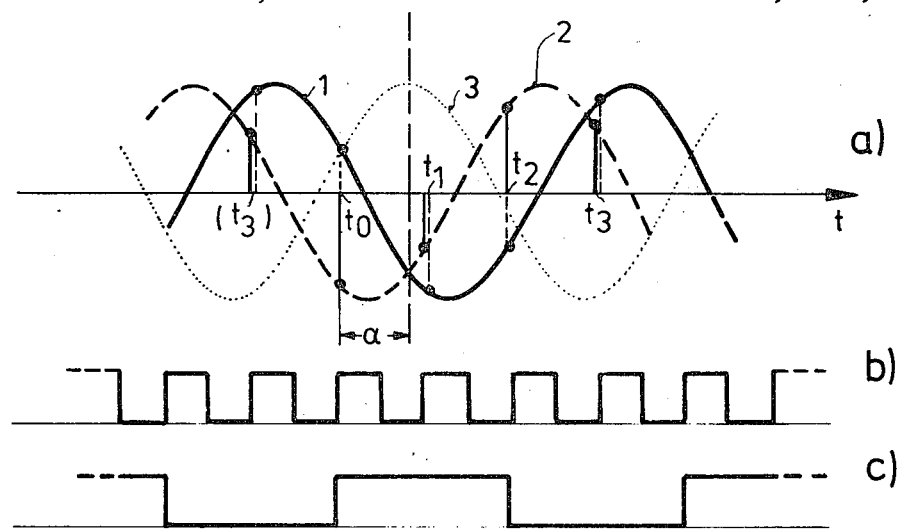
FIG. 1 shows cycles which are associated with chrominance oscillations of a television signal and are used for sampling.

FIG. 1a shows a sinusoidal alternating current signal 1 against time t which corresponds to the color burst signal of the color carrier frequency $F_o$ in one phase position obtained from a PAL color television signal. As is known, the color burst signal appears on the back porch during a short time interval which comprises, for example, ten sinusoidal cycles. The broken-line curve 2 shows the color burst signal in the other phase position. As is known, the phase position changes in accordance with the cycles 1 and 2 from line to line and, as compared with a reference signal U which, in particular, corresponds to the positive blue color difference signal +(B−Y), which is shown in the dotted curve 3 in FIG. 1a, has a phase shift of +135° and −135°, respectively.

The color burst signals 1 and 2, respectively, shown in FIG. 1a are sampled at the given points of time $t_0$, $t_1$, $t_2$, $t_3$, etc. Said sampling is controlled by a symmetrical square wave oscillation as shown in FIG. 1b, the frequency of which corresponds to four-fold of the frequency of a square wave reference signal shown in FIG. 1c. The reference oscillation 1c has approximately the same frequency (F) as the color carrier oscillations shown in FIG. 1a. The reference point of time $t_0$ corresponds to the leading edge of the reference oscillation shown in FIG. 1c which simultaneously corresponds to a leading edge of the clock signal shown in FIG. 1b. Between the two oscillations, however, a phase shift $\alpha$ occurs which is defined as a difference between the point of time $t_0$ and the point of time at which the reference signal U and the positive color difference signal (B−Y), respectively, have their maximum values. The phase relation between the curves 1, 2 and 3 of FIG. 1a and between the curves shown in FIGS. 1b and 1c is fixed.

The oscillation according to curve 1 corresponds to the formula $$b = \cos(2\pi Ft + 3\pi/4) \quad (1)$$

In a corresponding manner, the formula $$b' = \cos(2\pi Ft - 3\pi/4) \quad (2)$$

is obtained for curve 2.

For the time t the sampling moments $t_n$ are to be inserted $$t = n \cdot T - \alpha/2\pi F, \quad (3)$$

where F is the color carrier frequency and T is the clock period, T being equal to ¼ F.

$$b, b' = \cos(n \cdot \pi/2 + \pi \pm \pi/4 - \alpha) \quad (4)$$

is then obtained.

The following relationships are then obtained for the sampling moments, $t_0$, $t_1$, etc.

TABLE 1

$t_0$: n = 0  $b_0 = \cos(3\pi/4 - \alpha) = 1/\sqrt{2} (\sin \alpha - \cos \alpha)$ $t_1$: n = 1  $b_1 = \cos(5\pi/4 - \alpha) = 1/\sqrt{2} (-\sin \alpha - \cos \alpha)$ $t_2$: n = 2  $b_2 = \cos(7\pi/4 - \alpha) = 1/\sqrt{2} (-\sin \alpha + \cos \alpha)$ TABLE 1-continued $t_3: n = 3 \; b_3 = \cos(\pi/4 - \alpha) = 1/\sqrt{2} \; (\sin \alpha + \cos \alpha)$ $t_0: n = 0 \; b'_0 = \cos(5\pi/4 - \alpha) = 1/\sqrt{2} \; (-\sin \alpha - \cos \alpha)$ $t_1: n = 1 \; b'_1 = \cos(7\pi/4 - \alpha) = 1/\sqrt{2} \; (-\sin \alpha + \cos \alpha)$ $t_2: n = 2 \; b'_2 = \cos(\pi/4 - \alpha) = 1/\sqrt{2} \; (+\sin \alpha + \cos \alpha)$ $t_3: n = 3 \; b'_3 = \cos(3\pi/4 - \alpha) = 1/\sqrt{2} \; (+\sin \alpha - \cos \alpha)$ The first four values are obtained in curve 1 in FIG. 1a and the second four values are obtained in the next line interval in curve 2.

The following relationships occur:

$$b_n = -b_{n+2}; \; b'_n = b'_{n+2}; \; b_n = b'_{n-1} \quad (5)$$

So in each of the two blocks, the first and second and the subsequent sample values, respectively, are equal, apart from the sign, and between the first and the second block, a shift of the sample values occurs by one clock period.

With suitable allocation, it is possible to obtain from each of the two color burst signals, two quantities which depend individually but in a defined manner on the phase shift α. Generally, an amplitude factor A is to be considered which is to be inserted in the formulae of the table.

Two different values occur:

$$X = A/\sqrt{2} \cdot (+\sin \alpha + \cos \alpha) \quad (6)$$

and $$Y = A/\sqrt{2} \cdot (-\sin \alpha + \cos \alpha) \quad (7)$$

which may have one or the other sign.

Figure 2:
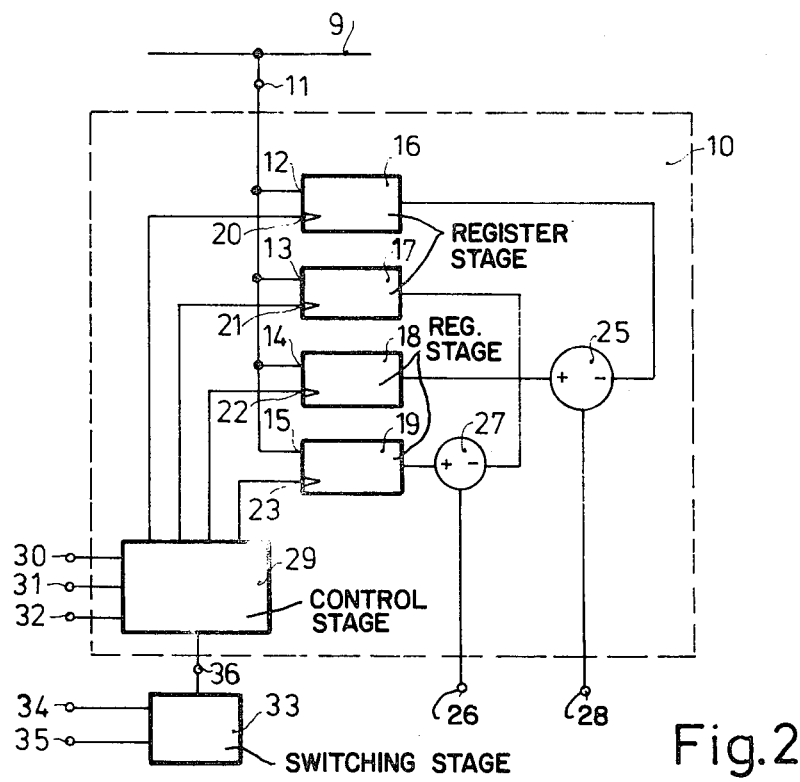
FIG. 2 is a block diagram showing a color burst signal sampler as may be used in the circuits shown in FIGS. 3 and 5.

In practice, these values can be obtained with a color burst signal sampler 10 shown in FIG. 2.

In this sampler 10, the digital chrominance signal is applied from a line 9 via a terminal 11 to the first inputs 12, 13, 14 and 15, respectively, of four register stages 16, 17, 18 and 19, respectively. Keying signals are applied to the second inputs 20, 21, 22 and 23 of said register stages 16, 17, 18 and 19, respectively, at the moments $t_o$, $t_1$, $t_2$ etc. (compare FIG. 1a). The amplitude value of the color burst signal at the instant in question in converted into a digital signal and is stored. The control is such that at the output of the register stages 16, 17, 18 and 19, in one interval, the values $b_o$, $b_1$, $b_2$ and $b_3$, respectively, and in the other interval, the values $b'_1=b_1$, $b'_1=b_2$, $b'_2=b_3$ and $b'_3=b_o$, respectively, occur. The output of the register stage 16 is subtracted from the output of the register stage 18 in a subtracting stage 25 so that the sampled difference signal according to formula (7) occurs at a terminal 28 connected to the output of the subtracting stage 25. In a corresponding manner, the output signal of the register stage 17 is subtracted in a subtracting stage 27 from the output signal of the register 19 so that at an output terminal 26 connected to the output of the subtracting stage 27 the signal according to formula (6) occurs.

The required sampling signals are supplied to the inputs 20, 21, 22, 23 by the allocated outputs of a control stage 29, to a first input terminal 30 of which the clock signal according to FIG. 1b, to a second input terminal 31 of which the reference signal according to FIG. 1c, and to a third input terminal 32 of which a PAL switching signal are respectively supplied, which, from line to line, hence with half-a-line frequency, assumes a different value and so produces the control according to the upper and lower parts of table 1. When an NTSC signal is received, such a control is not necessary.

Furthermore, horizontal sync. pulses are supplied to a switching stage 33 by an input terminal 34, and vertical sync. pulses are applied by an input terminal 35. In the switching stage 33, a switching signal is formed therefrom which always occurs when the color burst signal, or at least an oscillation thereof, is present in the chrominance signal available at the terminal 11. Said switching signal is supplied to an input of the control stage 29 from the output of the switching stage 33 via a terminal 36.

The sampled difference signals according to formulae (6) and (7) occurring at the outputs 26 and 28, are combined from two signal parts of the same nature by means of the subtracting stages 27 and 25 according to formula (5). As a result of this, it can be achieved that any additive direct current value parts in each of the signals are compensated and do not occur at the outputs 26 and 28.

Since the values according to formulae (6) and (7) occur with each individual oscillation of the color burst signal, it will suffice for the evaluation to use only one cycle of the curves 1 and 2, respectively. The control required therefor may be produced by the control and switching stages 29 and 33, respectively.

Figure 3:
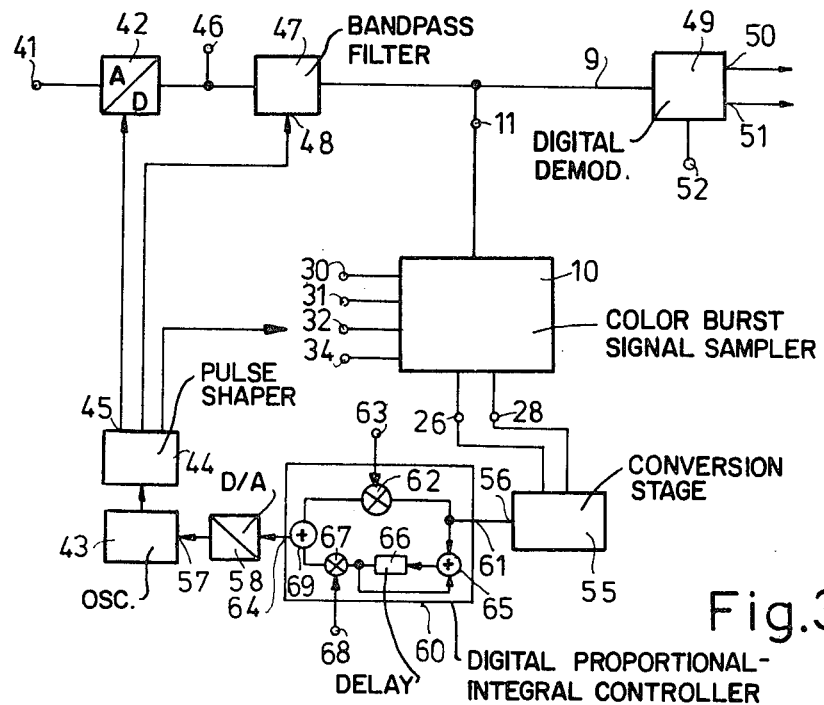
FIG. 3 shows an embodiment of the invention with phase control of the clock oscillator and optionally amplitude adjustment of the chrominance signal.

In the FIG. 3 embodiment an analog CVBS signal is applied to an analog-to-digital (A/D) converter 42 from a terminal 41. To said converter 42 is also supplied a clock signal from a generator which consists of a controllable oscillator 43 with a subsequent pulse shaper 44 which at its output 45 produces the clock signal for the converter 42.

The digital color television signal obtained at the output of the A/D converter 42 is supplied on the one hand, to a terminal 46 for the luminance signal processing and, on the other hand, to a bandpass filter 47 which at its output provides the filtered digital chrominance signal. The bandpass filter 47 also operates digitally and obtains at its second input 48 a clock signal from the pulse shaper 44. The digital chrominance signal is then applied to a known digital demodulator 49 which provides at its two outputs 50 and 51, the digital demodulated color difference signals; if suitable, switching signals are applied to at least one further input 52.

Figure 7A:
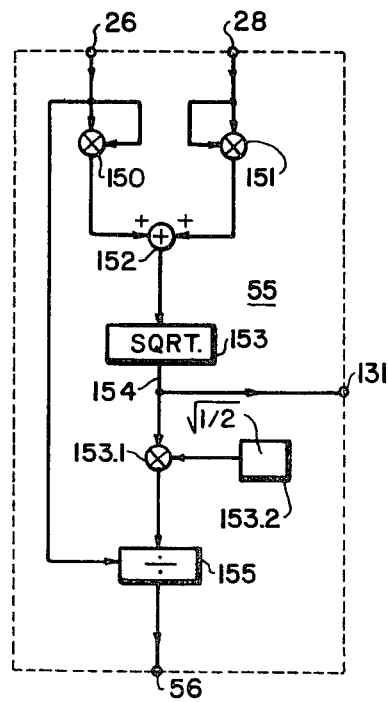
FIGS. 7A-7E show embodiments of a conversion stage for use in the embodiments of FIGS. 3-6.

The line 9 between the bandpass filter 47 and the demodulator 49 (the stage 137 initially remains out of consideration) is connected to a terminal 11 to which a color burst signal sampler 10, as shown in FIG. 2, is connected to the terminals 30, 31, 32 and 34 of which the signals stated there are supplied. The signals according to formulae (6) and (7) appear at the terminals 26 and 28. Said signals are supplied to a conversion stage 55 in which they are further processed according to the invention. As shown in FIG. 7A, the signal X from the terminal 26 and the signal Y from the terminal 28 are each supplied to squaring stages 150 and 151, respectively, and the signals $X^2$ and $Y^2$ thus obtained are added in a stage 152. From this sum the root is extracted in a stage 153. The amplitude factor value A thus obtained is applied via a line 154, to a multiplier 153.1 for multiplication by the square root of ½ and then to a divisor input of a divider stage 155 the signal X being applied to a dividend input thereof, at an output of which the scanning value X divided by the amplitude factor A times SQRT (½) occurs and a control signal of the formula $$\frac{X}{\sqrt{\frac{1}{2}(X^2 + Y^2)}} = (\sin \alpha + \cos \alpha) \quad (8)$$

is obtained.

At an output 56 of the conversion stage 55, a phase control signal thus occurs which is independent of an amplitude factor A of the color burst signal and only shows the angle dependance according to formula (8).

This phase control signal can be applied to a control input 57 of the oscillator 43, the control occurring so that the expression according to formula (8) becomes 0, so that the angle $\alpha = -45°$.

When the oscillator 43 is constructed analog—which of course is not necessary—the digital control signal from the output 56 must first be smoothed and converted into an analog control signal before it is applied to the oscillator 43. For that purpose, a digital-to-analog (DIA) converter 58 is required in the control line between the output 56 and the input 57. Smoothing may be carried out between the DIA converter 58 and the oscillator 43. A proportional-integral (PI) behavior of the control can also be effected in a digital PI-controller (60) which is connected between the output 56 and the digital-to-analog converter 58. The control signal is then applied from the input 61 in the controller 60, on the one hand, to a first multiplier stage 62, in which it is multiplied by a factor supplied from an input 63 which determines the proportional behavior. The output of the multiplier stage 62 is coupled to an output 64 of the stage 60.

On the other hand, the control signal from the input 61 is applied to an adder stage 65, the output signal of which is applied to a delay stage 66 delaying the signal by a clock interval. The output of the stage 66 is connected to a second input of the adder stage 65 so that the stages 65 and 66 form a stage for continuous summing (accumulator). The signal thus obtained and integrated in a way is applied, via a multiplier stage 67, to the first input of an adder 69 whose ouput 64 is connected to the digital-to-analog transducer 58. Said signal thus controls at the output 64 an integrating control part. Furthermore the control signal is applied from the input 61 via the first multiplier stage 62 directly to a second input of the adder 69 and forms a proportional control part at the output 64. For adjusting a desired control delay, adjusting signals having the action of multiplicity coefficients whose value can be chosen, are applied to the multiplier stages 62 and 67 via the inputs 63 and 68, respectively.

So in the FIG. 3 circuit, the clock signal is readjusted with respect to the color burst signal so that the sampling occurs by the clock signal corresponding to the four-fold color carrier frequency at 45°, 135°, 225° and 315°.

Figure 6:
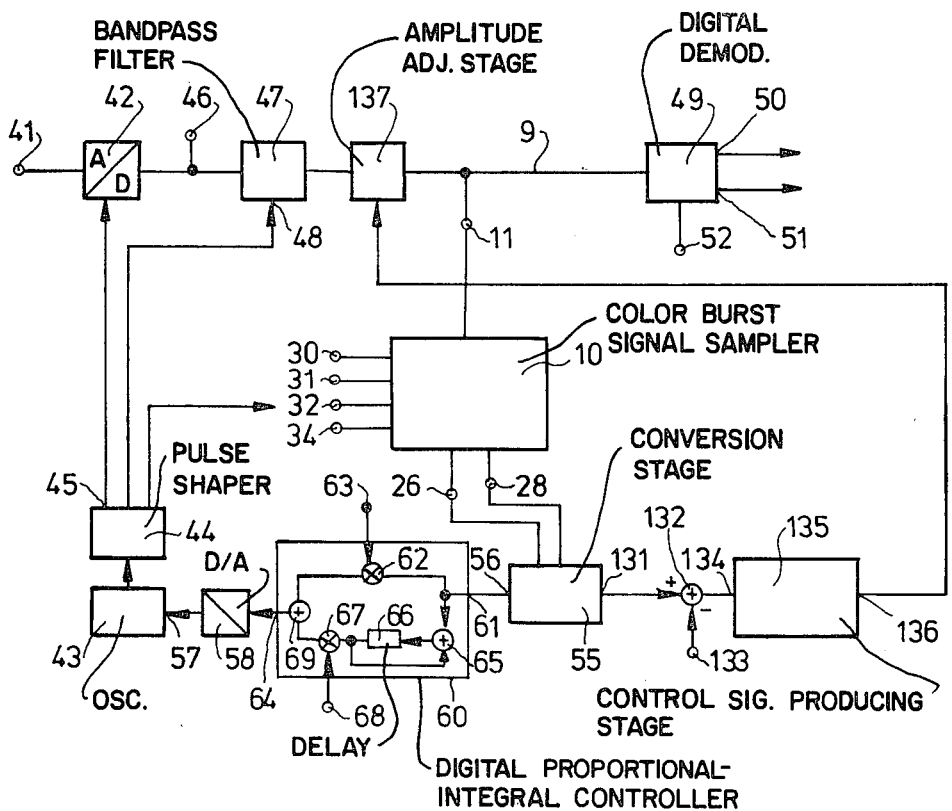
FIG. 6 shows an embodiment which perform both phase and amplitude control.

With the circuit according to FIG. 6, an amplitude control and/or amplitude adjustment is also possible. For that purpose, as shown in FIG. 7A, the line 154 which conveys the signal corresponding to the amplitude factor A is provided with an output 131 which hence conveys an output signal according to the formula $$\sqrt{X^2 + Y^2} = A$$

which corresponds to the amplitude of the scanned color burst signal and that independently of the phase angle referring to FIG. 6, this signal is applied to a first input of an adder stage 132, to a second input 133 of which a preset nominal value is given. In the adder stage 132 the nominal value at the second input 133 is subtracted from the signal supplied from the output 131 of the conversion stage 55. The difference represents an error signal which is applied to the input 134 of a control signal producing stage 135. The stage 135, for example, has a similar or the same construction as the controller 60, i.e. it represents a filter member and/or an integratingly transmitted filter member by which the error signal applied to the input 134 is smoothed. The smoothed signal appears at the output 136 of the stage 135 and is applied to an amplitude adjusting stage 137 in which the amplitude of the signal applied to the line 9 and the terminal 11 is adjusted at the predetermined nominal value. The amplitude adjusting stage 137 may be composed in a known manner of shift stages and a multiplier.

In the form shown the stage 137 is included in the control circuit. It may also operate as a pure forward control stage (adjusting stage), when it is connected in the line 9 after the branch to the terminal 11 and before the stage 49.

It is hence possible, by means of the FIG. 6 circuit arrangement, to perform both a phase control and also an amplitude control by means of the two signals X and Y appearing at the outputs 26 and 28 of the sampler 10 independently of each other, i.e. uncoupled from each other.

The control circuit described for controlling the amplitude A is also termed automatic chroma control device.

Figure 4:
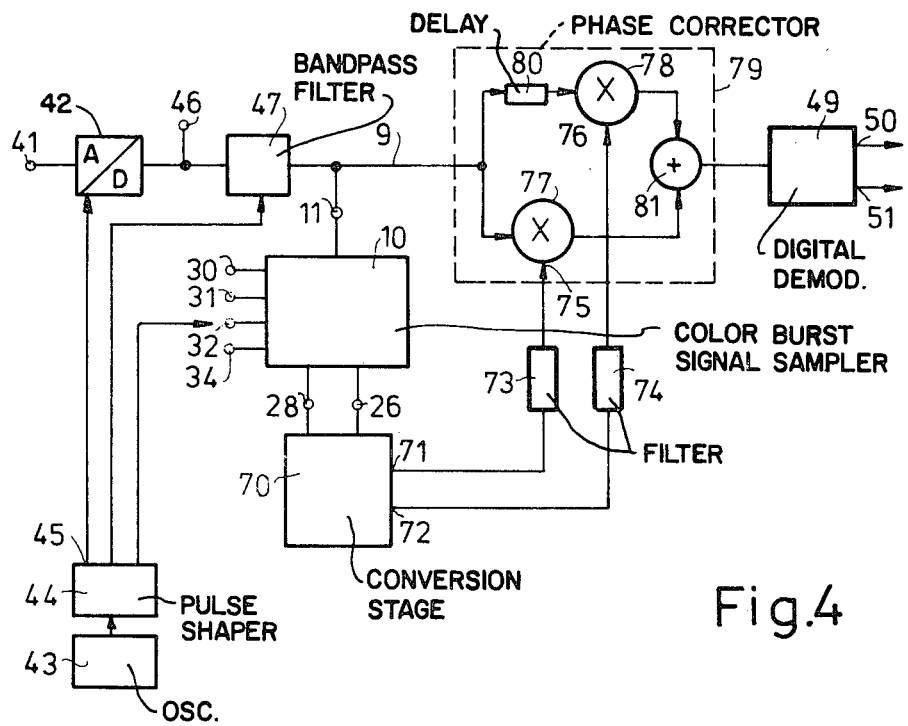
FIG. 4 shows an embodiment with phase shift of the chrominance signal.

FIG. 4 shows a circuit arrangement according to the invention in which the chrominance signal is converted in such manner as to comprise values without a phase shift. The analog CVBS color video signal, as in FIG. 3, is applied from a terminal 41 via the A/D converter 42 and the digital bandpass filter 47 to the line 9 connected to the terminal 11. The oscillator 43, which provides the clock signals via the pulse shaper 44, is not controlled by the digital chrominance signal and is free-running. The values obtained in the color burst signal sampler 10 according to formulae (6) and (7) appear at the terminals 26 and 28 and are supplied to a converter stage 70. Said converter stage 70 comprises a further conversion part which operates according to the following formula $$\frac{Y}{\sqrt{\frac{1}{2}(X^2 + Y^2)}} = -\sin \alpha + \cos \alpha \quad (9)$$

Figure 7B:
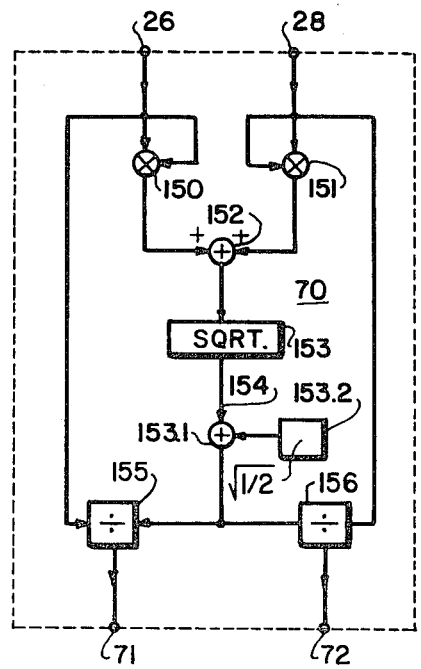

For that purpose, the values X and Y are first supplied from the terminals 26 and 28, as shown in FIG. 7B, to squaring stages 150 and 151 and are then summed in the stage 152 so that at its output the squared amplitude factor $A^2$ occurs. In the subsequently connected stage 153 the root is extracted therefrom. This resulting value is then multiplied by a constant factor, i.e., the square root of ½ in a multiplier 153.1 and is applied, on the one hand to a divisor input of a division stage 155, to a dividend input the signal X from the terminal 26 is also applied in such manner that at the output of said stage 155 and hence also at the output 71 of the converting stage 70 a signal according to formula (8) appears, and on the other hand, the output of multiplier 153.1 is applied to a divisor input of a second division stage 156, to a dividend input of which the Y-value from the terminal 28 is applied in such manner that at an output of the stage 156 and hence also at the output 72 of the converting stage 70 a signal according to formula (9) occurs. These signals from the outputs 71 and 72 are smooth via filters 73 and 74, respectively, and supplied to the first inputs 75 and 76 of the multiplication stages 77 and 78, respectively, which are provided in a phase corrector stage 79. The digital chrominance signal, which appears at the terminal 11, is supplied to the second inputs of the multiplication stages 77 and 78, on the one hand, directly and, on the other hand, via a stage 80 delaying by one clock period. The output signals of the stages 77 and 78 are combined in an adder stage 81 and may then be applied, as in FIG. 3, to a demodulator 49 known per se.

All the digital stages obtain clock signals from the pulse shaper 44, which is not shown in each case for clarity.

In the range of the color burst signal, the angle $\alpha$ which optionally contains deviations from the nominal value is fixed by means of the stages 10 and 70 and stored for the duration of the following picture line, for example at the output of the filters 73 and 74. The correction values thus obtained in the color burst interval are then supplied in a correcting manner to the chrominance signal during the following line in the phase correction stage 79. In the range of the chrominance signal transmission, so beyond the color burst signal, sample values $c_0$ to $c_3$ are obtained on the line 9 according to the following table 2.

TABLE 2

| $c_0 = U \cos \alpha + V \sin \alpha$ |
|---|
| $c_1 = U \sin \alpha - V \cos \alpha$ |
| $c_2 = -U \cos \alpha - V \sin \alpha$ |
| $c_3 = -U \sin \alpha + V \cos \alpha$ |

U and V are the color difference signals (B−Y) and (R−Y), respectively. The sign of the red color difference signal (R−Y) which changes according to the PAL standard in successive lines is not taken into account in this consideration but corrected only in the subsequent demodulator 49.

In the corrector stage 79, on the one hand, the present sample value is multiplied by a signal according to formula (8) and the value preceding in the sampling interval and obtained by means of the delaying stage 80 is multiplied in the stage 78 by a correction values according to formula (9). These two corrected values are then added in the stage 81 so that at the output of the stage 79 for the input of the demodulator 49 a signal appears which consists of a chrominance signal value and the chrominance signal value with the corresponding corrections sampled immediately before. Hence a corrected signal according to the following formulae is obtained $$c_1(\sin\alpha + \cos\alpha) + c_0(\cos\alpha - \sin\alpha) = \tag{10}$$

-continued $$(U\sin\alpha - V\cos\alpha)(\sin\alpha + \cos\alpha) + \tag{11}$$

$$(U\cos\alpha + V\sin\alpha)(\cos\alpha - \sin\alpha) = \tag{12}$$

$$U(\sin^2\alpha = \sin\alpha\cos\alpha + \cos^2\alpha - \cos\alpha\sin\alpha) + \tag{13}$$

$$V(-\cos\alpha\sin\alpha - \cos^2\alpha + \cos\alpha\sin\alpha - \sin^2\alpha) = \tag{14}$$

$$U - V \tag{15}$$

For the further sample values, each time corrected and combined with the then preceding sample value, is obtained in a corresponding manner (U+V), (−U−V) and (−U+V). From these values the color difference signals (B−Y) and (R−Y) can be derived in a simple manner in the demodulator 49, if desired in an additional stage.

As appears from the above formulae, the parts which are represented as products of sin and cos are eliminated in that in each individual sampling point, the values of the preceding sampling point is also added thereto. So no interference parts occur which would have to be separated optionally by additional filters.

The conversion may also be carried out by means of a register contained only in the stage 70 which is driven by X and Y, respectively, as an address and provides values according to formulae (8) and (9), respectively.

In the FIG. 4 embodiment, the phase correction is carried out in the channel of the chrominance signal. Undesired phenomena in the side bands of higher frequency may occur as a result of the modulation.

Figure 5:
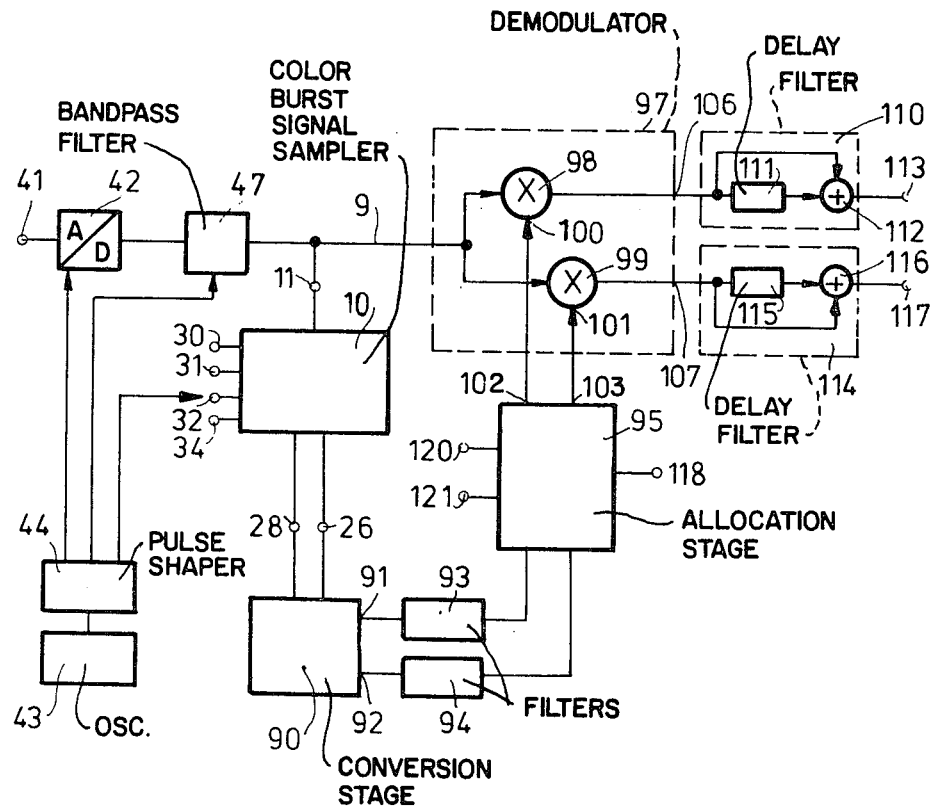
FIG. 5 shows an embodiment in which the reference signal is corrected in the demodulator to compensate for the phase deviation.

In the FIG. 5 embodiment the phase correction is hence carried out in the reference signal, which reference signal is unmodulated and hence shows no modulation-dependent sidebands.

For that purpose in FIG. 5, as in FIG. 4, the analog CVBS signal is supplied from the terminal 41 via the A/D converter 42 and the bandpass 47 to a line 9 which is connected to the terminal 11. The color burst signal sampler 10 is connected to the terminal 11 and provides to the terminals 26 and 28 signals according to formulae (6) and (7), respectively. These are converted in a converter stage 90 according to the following formulae $$\frac{X + Y}{\sqrt{2(X^2 + Y^2)}} = \cos \alpha \tag{16}$$

$$\frac{X - Y}{\sqrt{2(X^2 + Y^2)}} = \sin \alpha \tag{17}$$

Figure 7C:
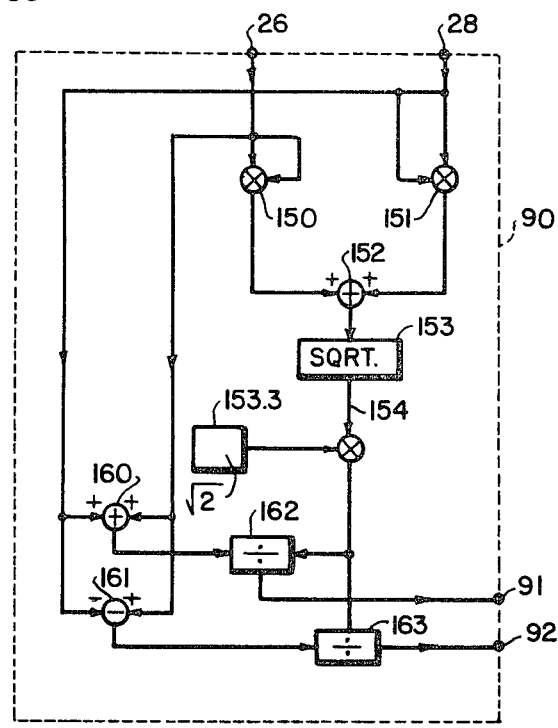

For that purpose, as shown in FIG. 7C, the squares are formed from the signals X and Y from the terminals 26 and 28 in the stages 150 and 151, respectively, and summed in the stage 152; in the stage 153 the root is then extracted therefrom. Moreover, the signals X and Y are added and subtracted, respectively, in the stages 160 and 161. The resulting sum and difference, respectively, is divided in the stages 162 and 163, respectively, by the root of the sum of the squares obtained by the stage 153 multiplied by the factor SQRT (2) in multiplier 153.1; phase-sensitive control quantities are obtained at the outputs 91 and 92 of the conversion stage 90 according to the formulae (16) and (17), respectively, smoothed each in filters 93 and 94, respectively, and then supplied to an allocation stage 95.

The digital chrominance signal obtained by sampling from the line 9 to which the terminal 11 is connected is supplied to a demodulator 97. This comprises two multiplier stages 98 and 99, the first inputs of which are connected to the line 9 from the terminal 11. The second input 100 of the multiplier stage 98 and the second input 101 of the multiplier stage 99 are connected to the first output 102 and the second output 103, respectively, of the allocation stage 95. Via the allocation stage 95, the phase correction signals $+\sin\alpha$ or $-\sin\alpha$ and $+\cos\alpha$ or $-\cos\alpha$ respectively, are connected alternatively to the inputs 100 and 101, respectively, of the multiplier stages 98 and 99 in such manner that one or the other demodulated color difference signal corrected in the PAL phase, respectively, appear at the outputs of said multiplier stages. This corresponds to the allocations according to the following tables.

TABLE 3 n =

0: $(U\cos\alpha + V\sin\alpha)\cdot\cos\alpha = U\cos^2\alpha + V\sin\alpha\cos\alpha$
1: $(U\sin\alpha - V\cos\alpha)\cdot\sin\alpha = U\sin^2\alpha - V\sin\alpha\cos\alpha$
2: $(-U\cos\alpha - V\sin\alpha)\cdot(-\cos\alpha) = U\cos^2\alpha + V\sin\alpha\cos\alpha$
3: $(-U\sin\alpha + V\cos\alpha)\cdot(-\sin\alpha) = U\sin^2\alpha - V\sin\alpha\cos\alpha$

TABLE 4 n =

0: $(U\cos\alpha + V\sin\alpha)\cdot\sin\alpha = U\sin\alpha\cos\alpha + V\sin^2\alpha$
1: $(U\sin\alpha - V\cos\alpha)\cdot(-\cos\alpha) = -U\sin\alpha\cos\alpha + V\cos^2\alpha$
2: $(-U\cos\alpha - V\sin\alpha)\cdot(-\sin\alpha) = U\sin\alpha\cos\alpha + V\sin^2\alpha$
3: $(-U\sin\alpha + V\cos\alpha)\cdot\cos\alpha = -U\sin\alpha\cos\alpha + V\cos^2\alpha$ In the first expression in brackets of each line of the two tables, there are recorded the signal combinations obtained successively by sampling with their dependance on the angle $\alpha$. Subsequently, each time the correction factor, which is transmitted by the allocation stage 95 and is added by multiplication, is recorded. From point to point the values on the right hand of the equality signs are obtained, namely at the output 106, the values according to table 4 and at the output 107, the values according to table 3. A smoothing filter 110 is connected to the output 106 and consists of the series arrangement of a stage 111 delaying by one clock period and a summing stage 112 whose second input is connected to the input of the delaying stage 111. Hence the sum of each corrected value corresponding to the right-hand side of table 4 with the value obtained in the preceding clock period occurs at the output 113 so that only the value V—corresponding to the red color difference signal $\pm(R-Y)$—is obtained.

In a corresponding manner, a filter 114 having a stage 115 delaying by one clock and an adder stage 116 is connected in the same circuit arrangement to the output 107 in which in accordance with the control from the allocation stage 95 at the output the value U occurs—corresponding to the blue color difference signal (B−Y).

Figure 7D:
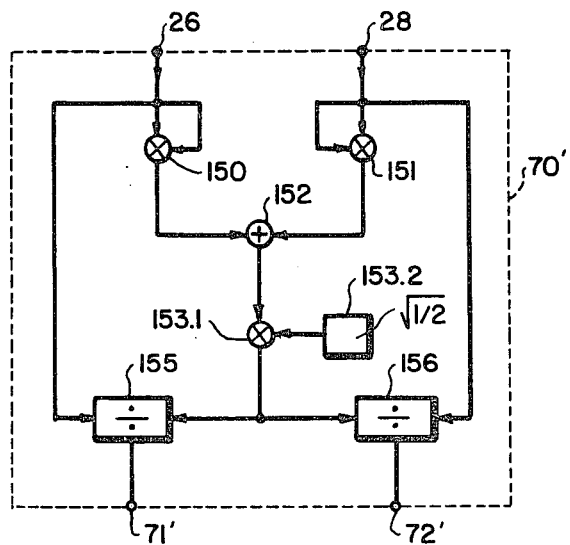

In order to avoid errors which occur by fluctuations of the amplitude factor A in the color difference signals (B−Y) and (R−Y), respectively, an amplitude control may be provided additionally in the circuits shown in FIGS. 3 and 4, respectively. For that purpose, the conversion stages 70 and 90, respectively, are changed so that from the quanties X and Y supplied via the terminals 26 and 28, they form two output signals which are inversely proportional to the amplitude factor A. For example, in FIG. 4, conversion stage 70 is replaced by conversion stage 70' as shown in FIG. 7D in which signals according to the following formulae are provided at the outputs 71' and 72':

$$\frac{\sqrt{2}\cdot X}{X^2 + Y^2} = \frac{1}{A}\cdot(\sin\alpha + \cos\alpha) \tag{19}$$

$$\frac{\sqrt{2}\cdot Y}{X^2 + Y^2} = \frac{1}{A}\cdot(-\sin\alpha + \cos\alpha) \tag{20}$$

In the multiplication of the signals from the output terminals 71' and 72' by the sampled chrominance signal supplied via the lines 9 in the phase correction stage 79, amplitude errors, if any, are compensated for.

Figure 7E:
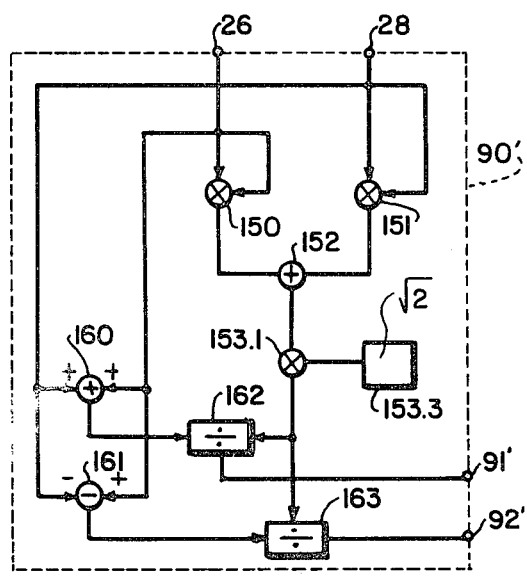

A corresponding amplitude compensation can also be carried out in the circuit arrangement shown in FIG. 5. For that purpose, the conversion stage 90 is replaced by conversion stage 90' as shown in FIG. 7E in which the output signals supplied by the conversion stage 90' at its outputs 91' and 92' are formed from the signals supplied via the terminals 26 and 28 according to the following formulae:

$$\frac{X + Y}{\sqrt{2}\cdot(X^2 + Y^2)} = \frac{1}{A}\cdot\cos\alpha \tag{21}$$

$$\frac{X - Y}{\sqrt{2}\cdot(X^2 + Y^2)} = \frac{1}{A}\cdot\sin\alpha \tag{22}$$

The indicated values according to formulae (19) to (22) can be obtained in a simple manner in that in FIGS. 4 and 5, respectively, the stage 153 for extracting roots is omitted. The original signal then is not divided by the amplitude factor value but by its square so that the proportional part is omitted and the inverse part remains.

What is claimed is:

1. A circuit arrangement in a color television receiver for obtaining a phase-sensitive control quantity which depends on the phase shift of a color burst signal, having an amplitude factor (A), with respect to a reference signal, preferably of approximately the same frequency, which is phase-locked to a clock signal with which the amplitude values of the color burst signal are sampled and whose frequency is the 4n-fold of the frequency of the reference signal, in which n is an integer of the series 1, 2, ... and the keying occurs in such manner that a first sampled difference signal (X) and a second sampled difference signal (Y), shifted by a quarter of a cycle of the color burst signal, are obtained, wherein said sampled difference signals are proportional to the amplitude factor (A) of the color burst signal and which depend on the phase angle ($\alpha$) of the color burst signal with respect to a point of time determined by the reference signal according to an angular function, said sampled difference signal (Y) being the difference between a third and a first of said samples while said sampled difference signal (X) being the difference between a fourth and a second of said samples, said circuit arrangement comprising a conversion stage in which the sampled difference signals (X and Y) are squared and the root is extracted from their sum in such a manner that the amplitude factor (A) is obtained, and in which furthermore at least a phase-sensitive control quantity, which is dependent on the phase angle ($\alpha$) and is at least substantially independent of the amplitude factor, is obtained for controlling said reference signal, characterized in that the conversion stage comprises in particular logic circuit elements in which at least one of the sampled difference signals is divided by the amplitude factor (A) in such manner that at least one phase-sensitive control quantity is obtained which consists substantially of sin- and cos-members of the phase angle ($\alpha$) which is at least substantially independent of the amplitude factor.

2. A circuit arrangement is claimed in claim 1, characterized in that the conversion corresponds substantially to the formula $X/\sqrt{(X^2+Y^2)}$ and $Y/\sqrt{(X^2+Y^2)}$, respectively, so that a control quantity is obtained which is proportional to ($\pm\sin \alpha + \cos \alpha$).

3. A circuit arrangement as claimed in claim 1 or 2, characterized in that the conversion corresponds substantially to the formula $(X\pm Y)/\sqrt{(X^2+Y^2)}$ so that a control quantity is obtained which is proportional to $\cos \alpha$ and $\sin \alpha$, respectively.

4. A circuit arrangement as claimed in claim 1, characterized in that the output values of said conversion stage are stored in the form of a value table and are read back by means of X and Y, respectively, as addresses.

5. A circuit arrangement as claimed in claim 4, characterized in that the phase control quantity is supplied to an oscillator determining the clock signal, for frequency and phase control.

6. A circuit arrangement as claimed in claim 5, characterized in that a phase control quantity corresponding approximately to $\sin \alpha$ is supplied to the oscillator for controlling so that a control at the nominal value of $\alpha=0°$ is effected.

7. A circuit arrangement as claimed in claim 6, characterized in that a phase control quantity which is proportional to ($\sin \alpha - \cos \alpha$) is supplied to the oscillator so that a control at the nominal value $\alpha=45°$ is effected.

8. A circuit arrangement as claimed in claim 5 or 7, characterized in that the phase control quantity is supplied to the oscillator via a filter which transmits proportionally.

9. A circuit arrangement as claimed in claim 8, characterized in that the phase control quantity additionally depends on the amplitude of the color burst signal in such manner that the output signal of the multiplier stage becomes independent of fluctuations of the amplitude of the color burst signal.

10. A circuit arrangement as claimed in claim 9, characterized in that the phase control quantity is inversely proportional to the amplitude of the color burst signal.

11. A circuit arrangement as claimed in claim 1 or 5, characterized in that for correcting the phase of the reference signal with a frequency which is the same with respect to the color burst signal, the phase control quantity and the reference signal are supplied to a multiplier stage whose output signal provide the phase-corrected and phase-correct demodulated chrominance signal.

12. A circuit arrangement as claimed in claim 11, characterized in that the output signal is combined additively with the output signal of a further multiplier stage driven with another phase control quantity and the reference signal via a delaying stage.

13. A circuit arrangement as claimed in claim 12, characterized in that from the first and second sampled signals, a first phase control quantity corresponding to ($\sin \alpha + \cos \alpha$) and a second phase control quantity corresponding to ($\cos \alpha - \sin \alpha$) are formed and are supplied, each via a filter retaining higher frequency signals, to a first and a second mixer stage, respectively, at the first input, to the other input of which the chrominance signal is supplied directly and delayed by one clock period, respectively, and whose output signals are combined in an adder stage in such manner that the chrominance signal appears substantially without phase error at the output of the adder stage.

14. A circuit arrangement as claimed in claim 12, characterized in that a first phase control quantity corresponding to $\sin \alpha$ and a second phase control quantity corresponding to $\cos \alpha$ are formed from the first and the second sampled signals and, preferably via, each time, a filter retaining higher frequency parts, are provided via an allocation stage alternately and with varying signs to a third and fourth multiplier stage to the other inputs of which the chrominance signal is supplied, the allocation being such that the signals comprised on the chrominance signal in orthogonal modulation appear demodulatedly at the outputs of the multipliers stages.

15. A circuit arrangement as claimed in claim 14, characterized in that the output signals of the multiplier stages are supplied, each via a filter suppressing higher frequency parts.

16. A circuit arrangement as claimed in claim 15, characterized in that the output signal of the multiplier stages are supplied to adder stages, respectively, on the one hand, directly and, on the other hand, via delaying stages respectively, each delaying, by an interval corresponding to a quarter of a cycle of the chrominance signal, so that at the output of the adder stages the filtered demodulated signal occur.

17. A circuit arrangement as claimed in claim 1, characterized in that the color burst signal whose sampled difference signals are supplied to the conversion stage is controlled in amplitude by means of the obtained amplitude factor and a previously determined value.

18. A circuit arrangement as claimed in claim 17, characterized in that the obtained amplitude factor value is also supplied to an amplitude adjusting member adjusting the amplitude of the color burst signal.

19. A circuit arrangement as claimed in claim 18, characterized in that the amplitude factor value is supplied to the amplitude adjusting member via a filter member which transmits proportionally and integratingly.

20. A circuit arrangement as claimed in claim 18 or 19, characterized in that the amplitude factor value is supplied via an adder stage to the amplitude adjusting member, in which adder stage the amplitude control quantity is compared with a previously determined nominal value.

* * * * *